May 17, 1955
J. MATICH
2,708,543
RUBBER GRIP ROOF LADDER
Filed July 13, 1953
2 Sheets-Sheet 1
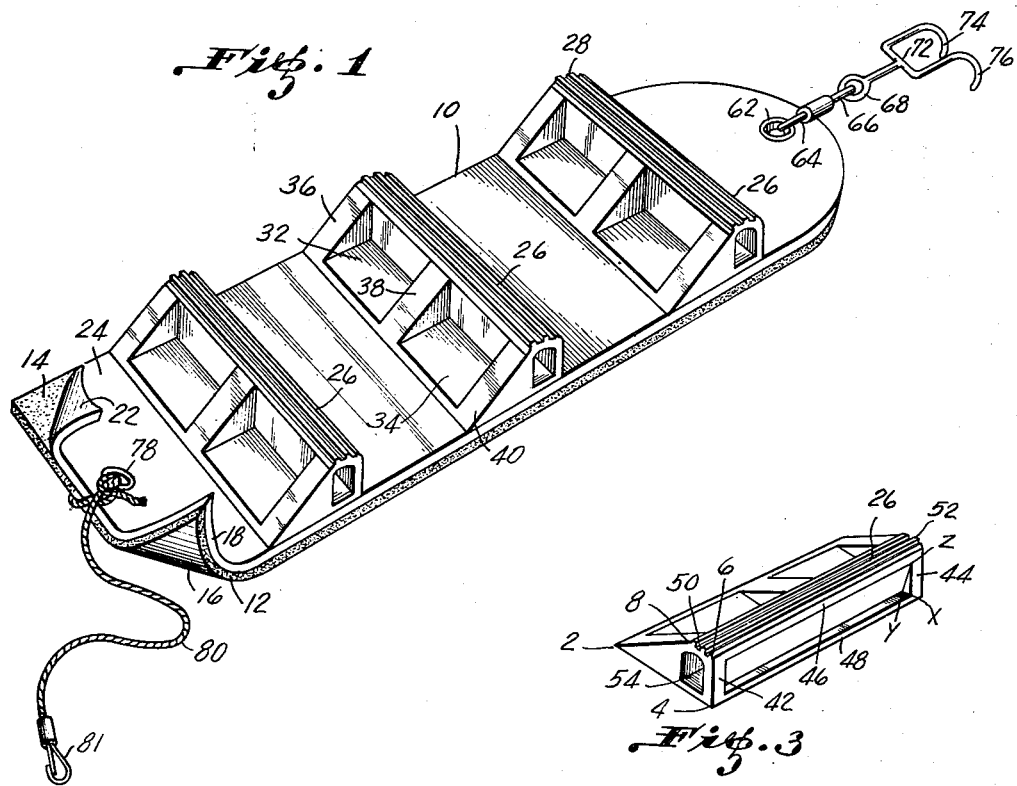
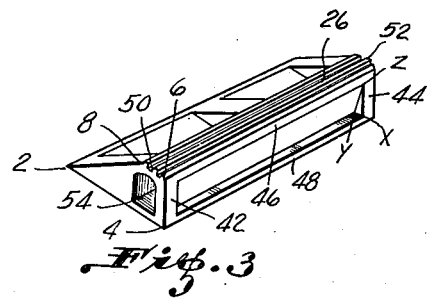
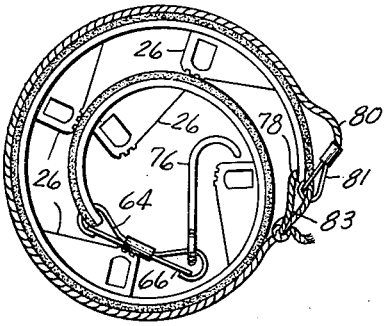
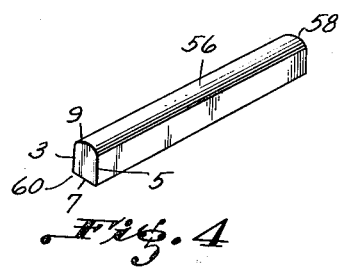
INVENTOR
John Matich
BY
ATTORNEY May 17, 1955    J. MATICH    2,708,543
RUBBER GRIP ROOF LADDER
Filed July 13, 1953
2 Sheets-Sheet 2
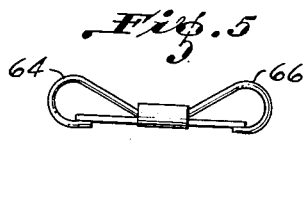
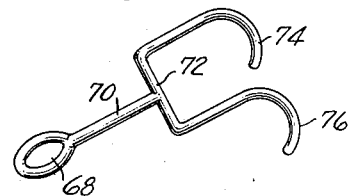
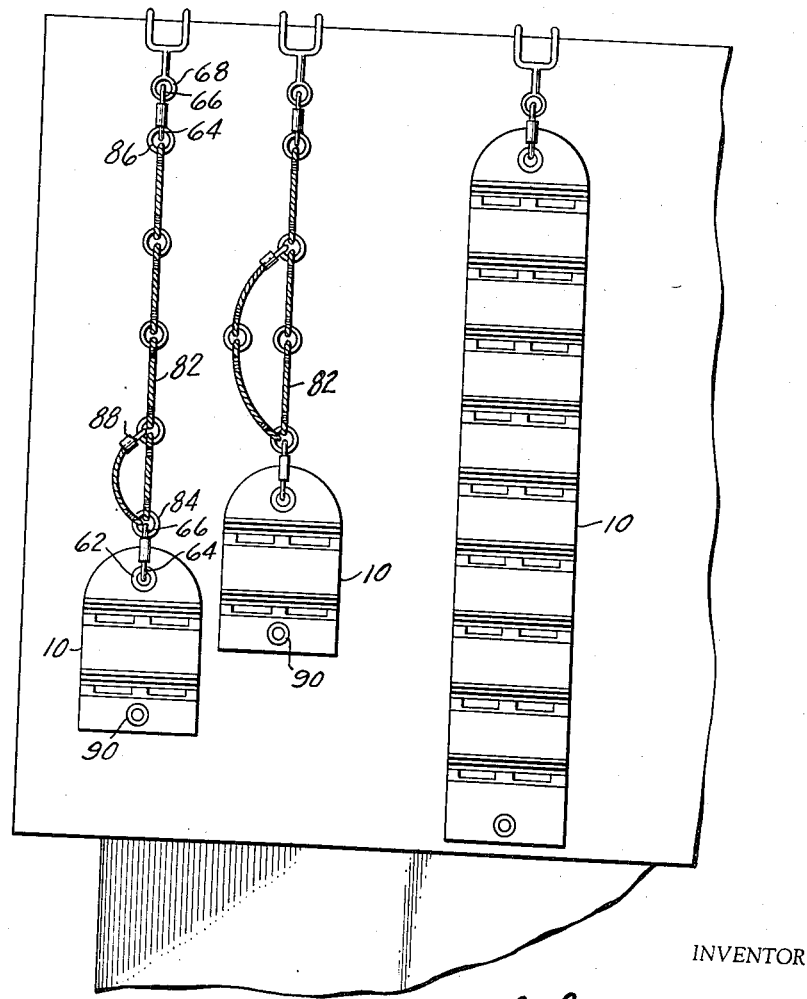
INVENTOR
John Matich
BY
ATTORNEY

United States Patent Office 2,708,543
Patented May 17, 1955

2,708,543

RUBBER GRIP ROOF LADDER

John Matich, Dravosburg, Pa.

Application July 13, 1953, Serial No. 367,394

3 Claims. (Cl. 228—51)

This invention relates to ladders, and more particularly to a rubber roof ladder for attachment upon a roof of a building.

An object of the invention is to readily and firmly secure a rubber roof ladder of full length, or one of several rungs, to the roof of a building through the medium of the strong cohesive abilities of the sponge rubber base of the ladder.

A further object of the invention is to provide a safer ladder whose non-skid rubber rungs and rubber base, grip firmly in wet weather as well as dry, is comparatively light, easily portable and yet compact and sturdy in structure.

Another object of the invention is to provide a roof ladder constructed of flexible rubber which molds in with the contour of any roof, and is yet devoid of more expensive articulated sections usually employed for flexibility in other types of ladders.

These together with various additional objects which will become apparent as the following description proceeds, are attained by this device, a preferred embodiment of accompanying drawings wherein:

Figure 1 is a perspective view in enlarged scale of several sections of the invention.

Figure 2 is a side elevational view of the ladder showing it in a rolled condition for carrying or storage.

Figure 3 is a perspective view of one of the ladder's rubber rungs with hollowed center.

Figure 4 is a perspective view of a wooden centerpiece comprising an element which fits into hollow of rubber rung in Figure 3.

Figure 5 is a perspective view of a double snaphook which is used to connect various elements of the invention.

Figure 6 is a perspective view of the hook comprising another element of the invention.

Figure 7 is a plan view of a full length rubber ladder and two shorter versions of the same ladder, all of which anchor to the roof by their adhesive rubber bases, and are aided further as shown with hook and rope.

Reference numeral 10 will be generally used herein to designate the rubber roof ladder in the accompanying drawings wherein identical numerals designate similar parts throughout the various views.

The uses for the rubber roof ladder are varied, such as placing it upon any existing roof of a building for making repairs thereon, for installation of antennas, or for any similar purposes.

It would be of much convenience to a group of roof-workers on the same roof to use a full-length rubber ladder as the main passageway to and from the peak of the roof for the transferring of materials, tools and the like, while shorter versions of the same ladder as shown in Figure 7, could be used, one or two by each worker at various areas of the roof. When two are used and one desires to change position on the roof it is convenient to adjust one of the ladders while standing on the other one and then stepping on to the adjusted ladder.

The hook is added more or less for psychological reasons of doubly assuring one that the ladder is safe, however tests have shown that one can stand on the ladder with absolute safety while the hook is detached, due to the adhesive rubber base of the ladder, whereas if the hook of any other known type of ladder would slip or become dislodged in any manner, that ladder would, if on a steep sloped roof, probably slide and cause an accident.

The rubber ladder consists of an elongated slab of porous sponge rubber 12, said slab being oblong and having upper flat surface as at 14 and lower flat surface as at 16. The said upper surface is parallel to and below another slab of rubber 18 which is of equal proportions to slab 12 excepting that slab 18 is constructed of solid rubber that is reenforced with cord throughout as is partly indicated by upturned flap showing lower flat surface 22 of said slab 18 which also has upper flat surface 24. Lower flat surface 22 of slab 18 is vulcanized to upper flat surface 14 of slab 12. To the upper flat surface 24 of slab 18 is vulcanized a series of elongated hollow rubber rungs 26 having ends 28 and 30 and having a side-view contour as shown in Figure 3 which begins at 2, goes across to 4, upward to 6 continues in an arc across to 8 and finishes at an angle down to 2.

Designated in Figure 1 are two niches 32 and 34 cut in the back of each rung, thus leaving three triangular braces 36, 38, and 40 to support the rest of the rung when it's stepped on.

The front of the rung as shown in Figure 3 is notched inward from X to Y to Z, almost length of the rung, leaving ends 42 and 44 as braces and providing an instep between the upper front stepping surface 46 and the lower front section 48.

The top rubber surface of the rung as denoted from 50 to 52 is treaded and the hollow center of the rung from end to end is designated by 54, into which the elongated wood center-piece 56 of Figure 4 fits, said center-piece having side-view contour consisting of two straight vertical sides 3 and 5, a straight horizontal bottom 7 and an arced top 9, said center-piece is fitted into hollow 54 of rung until end 58 of said center-piece reaches end 30 of said rung and until end 60 of same center-piece is equal with end 28 of said rung.

A grommet or a hole 62 is provided at the front end of and through both slabs 12 and 18 as seen in Figure 1 through which one end 64 of a double-snap hook illustrated in Figure 5, is snapped and the other end 66 is snapped to a loop 68 at one end of a shank 70, whose other end has a cross-bar 72 whose ends turn abruptly forward to form a pair of hook members 74 and 76.

The ladder is easily rolled up for carrying or storage as seen in Figure 2 whereby one end of a rope is fastened with a slack loop 83 through a grommet or hole 78 at bottom of ladder. After the rope 80 is wrapped around the rolled up ladder, a single snap-hook 81 at the rope's loose end is snapped onto the slack end of the previous loop 83 tied at the opposite extremity of the same rope.

Figure 7 shows a plan view of a full length ladder and two shorter versions in emplacement upon a roof. The shorter versions are identical to the longer one in all respects except that they are of but two rungs each and each has a rope 82 to extend it to position desired. The rope has a ring 84 tied near to one of its ends to which end 66 of a double-snaphook is snapped and the other end 64 of same snaphook is snapped through the hole of grommet 62 at top of ladder. At the opposite end of the rope is another ring 86 and between it and ring 84 is tied a series of rings identical to them throughout the rope's length spaced at intervals and to any one of which, end 66 of last mentioned snaphook can be snapped depending on the length of rope needed. To the said end ring 86 is snapped end 64 of another double snaphook, whose other end 66 is snapped to loop 68 at the shank end of hook members described above. A single snaphook 83 at the extreme lower end of the rope is used to take up the slack in the rope by snapping it onto any one of the metal rings mentioned, depending on the length of the slack existing.

The grommets 90 at the lower ends of the short ladders are provided to enable the worker who so desires, to connect two or more short ladders with double snap-hooks of the kind shown in Figure 5.

To place the longer rubber ladder on the roof one carries it up a rigid ladder that is positioned against the eaves and places it on the edge of the roof in the rolled up condition shown in Figure 2. The hook is unsnapped and the ladder due to its rubber construction and springy rolled up condition is easily unrolled a little by pushing it forward and then while standing on the unrolled part which adheres firmly to the roof, one continues this same process of pushing and stepping until the peak of the roof is reached where hook is anchored for double safety assurance. Another method would be for one man to carry the rolled ladder up through a roof scuttle, hook one end to the roof's peak and allow the rest of the ladder to roll down into position. Still another means would be to pass a long rope over the house, pull the rope with the ladder attached until the hook passes over the rooftop and becomes engaged therewith.

One may stack the short rubber ladders, carry two or more up a rigid ladder to the edge of the roof, untie them and place one near the roof's edge, step on it and place another on the roof immediately above it, step on it and continue this same process until the peak of the roof is reached where one or all are anchored as shown in Figure 7. Another means to position the short ladders would be to carry them up on a full length roof ladder that's already been placed on the roof.

It isn't intended to confine the invention to the precise construction drawn and described herein. For example this ladder could be built of various materials, wood, metal, plastic, etc., and yet include a rubber base similar to the one described herein, or use solid rubber rungs instead of the part rubber and wood rungs described above and use builtin suction cups of rubber to increase gripping strength of ladder's rubber base. From these examples one can readily understand that all suitable modifications or equivalents may be resorted to which fall within the scope of the appended claims.

I claim:

1. A roof ladder comprising a base formed of an elongated slab of sponge rubber adapted to adhere to a roof, a slab of cord reinforced solid rubber attached to the top surface of said sponge rubber slab, one or more rubber rungs attached to the top surface of said solid rubber slab, the front side of said rung being inwardly and downwardly notched to form a toe hold.

2. A roof ladder as defined in claim 1, said rung being formed with an elongated hollow interior and a rigid reinforcing member filling said hollow interior.

3. A roof ladder as defined in claim 1, the rear side of said rung being inclined downwardly and rearwardly, there being spaced vertical notches formed in said rear side, leaving spaced vertically extending reinforcing means for the rung.

References Cited in the file of this patent

UNITED STATES PATENTS

| | | |
|---|---|---|
| 1,617,271 | Penfield | Feb. 8, 1927 |
| 1,815,435 | Harding | July 21, 1931 |
| 1,877,527 | Moran | Sept. 13, 1932 |
| 2,288,054 | Walton | June 30, 1942 |
| 2,628,011 | Buechler | Feb. 10, 1953 |